Oct. 21, 1958

E. A. JOHNSON ET AL 2,856,680

DIAPHRAGM PERFORATING AND CLAMPING MEANS

Filed Dec. 19, 1955

INVENTOR.
ELDON A. JOHNSON
DONALD R. COMPTON
BY

ATTORNEY

Oct. 21, 1958 E. A. JOHNSON ET AL 2,856,680
DIAPHRAGM PERFORATING AND CLAMPING MEANS
Filed Dec. 19, 1955 2 Sheets-Sheet 2

INVENTOR.
ELDON A. JOHNSON
DONALD R. COMPTON
BY
ATTORNEY

United States Patent Office 2,856,680
Patented Oct. 21, 1958

2,856,680

DIAPHRAGM PERFORATING AND CLAMPING MEANS

Eldon A. Johnson, St. Louis, Mo., and Donald R. Compton, Belleville, Ill., assignors, by mesne assignments, to A. C. F. Industries, Incorporated, New York, N. Y., a corporation of New Jersey Application December 19, 1955, Serial No. 554,089

1 Claim. (Cl. 29—432)

This invention relates to engine driven fuel pumps of the diaphragm type particularly suitable for automotive use, and, more specifically, to an improvement in the method of assembling the diaphragm in the pump housing to obtain a better seal, permitting the use of narrower clamping flanges on the opposite faces of the pump housing, and thereby a reduction in pump size.

It is the usual practice in the pump art to preform the holes around the periphery of the diaphragm for the clamping screws, and then assemble the pump by presetting the diaphragm loop in the rocker body and clamping the diaphragm between the flanges on the rocker body and valve casing by inserting screws through the flanges and holes in the diaphragm, and tightening the screws.

Modifications in pump structure such as shown in a prior application of Eldon A. Johnson and Jack M. White, Serial No. 456,360, filed September 16, 1954, obtain more pump capacity from the same pump size but require diaphragms initially larger in diameter than the flanges of the pump. When assembled with the stem, the loop is partly formed, which reduces the diameter to some extent. The looping operation during pump assembly reduces the diameter still further to that of the flanges, and, in the process, results in a tendency to form wrinkles at the edge of the diaphragm. Inasmuch as the preformed holes are located on a larger circle than the holes in the flange, alignment between the two is difficult unless the wrinkles are uniform. Furthermore, final testing has revealed some leakage at the flange, or through the diaphragm screw holes, when assembled by production line methods. Because of this difficulty, width of the flanges necessary to obtain an effective seal has become a limiting factor in pump size.

It has been discovered that the cause of leakage above referred to has resulted from the clamping force on the edges of the diaphragm. This clamping force compresses the surplus material present and produces elongation of the preformed holes in the diaphragm in a radial direction inwardly toward the center of the diaphragm. This leaves insufficient surface at the inside of the flanges to give an effective seal near the screw holes.

According to the present invention, the diaphragm is imperforate when assembled, and after it is properly looped during assembly, it is tightly clamped between the flanges of the rocker arm housing and the valve casing. This step flattens the wrinkles, compressing the material of the diaphragm, both circumferentially and radially, to its final form. The flanges are then secured by screws which have cutting edges and form the holes in the diaphragm during insertion.

This sequence of steps results in an assembled pump in which the diaphragm holes tightly surround the screws in perfect alignment. In fact, this improvement makes possible a substantial reduction in flange width.

Other objects and advantages of this invention will become apparent as this description proceeds.

The accompanying drawings illustrate one manner in which the invention may be carried out.

Figure 1:
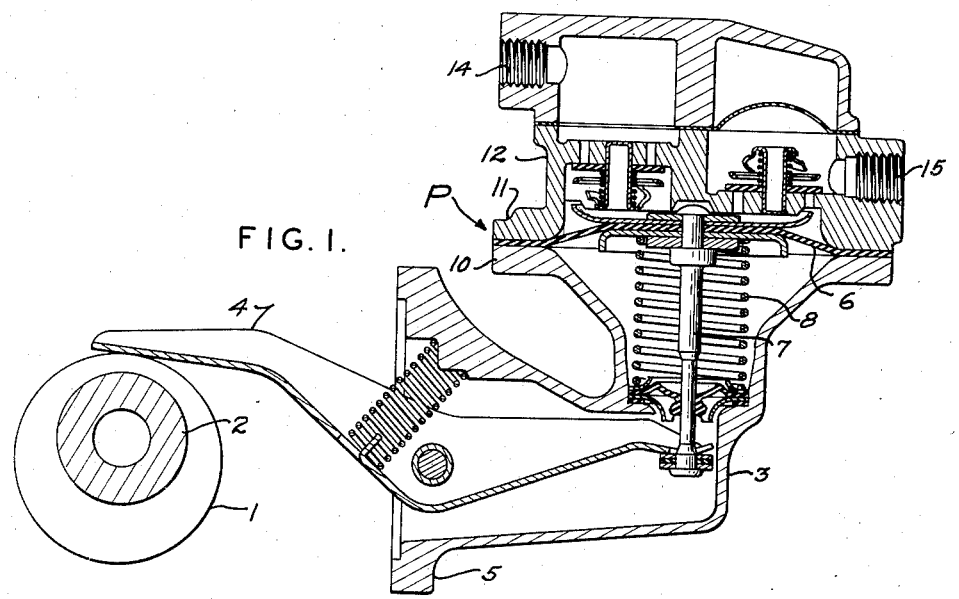
Fig. 1 illustrates a conventional type of fuel pump in vertical section.

Fig. 1 shows a fuel pump P operated from an eccentric 1 on the camshaft of an engine 2. The pump P has a rocker arm housing 3 pivotally mounting the usual rocker arm 4 driven from the eccentric 1. A suitable flange 5 on the rocker arm housing 3 is provided with bolt holes for mounting on the engine.

Within the pump is the usual diaphragm 6 reciprocated by the rocker arm 4 through a stem 7 and compression spring 8. Oppositely facing flanges 10 and 11 on the rocker housing 3 and on the valve casing 12, respectively, clampingly engage the periphery of the diaphragm 6. Within the valve casing 12 are suitable valves for the inlet and outlet of the pump 14 and 15, respectively. Since this construction forms no part of the present invention, the application will not be burdened with a detailed description. The arrangement of the parts is, in most respects, the same as that shown in the prior application of Johnson and White.

Figure 2:
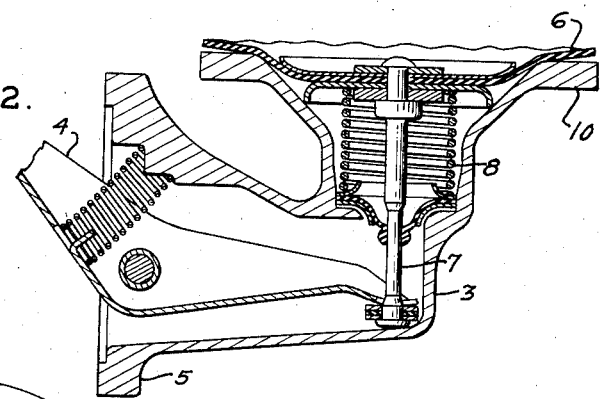
Fig. 2 illustrates one type of looping operation performed in assembly of the pump.

Figs. 2 to 5, inclusive, illustrate the successive steps in assembling the pump P. Referring to Fig. 2, the first step is to preform the loop in the diaphragm 6 in order to obtain sufficient slack to permit reciprocation of the stem 7. This step may be performed in any suitable jig for the purpose, and it will be noted, as a result of the looping operation, the size of the diaphragm 6 is materially reduced so as to correspond with the outside diameter of the flange 10.

Figure 3:
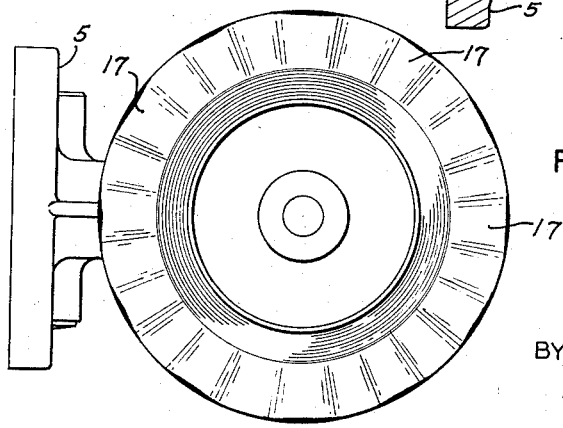
Fig. 3 is a top plan view of the diaphragm as it would appear in Fig. 2.
Figure 4:
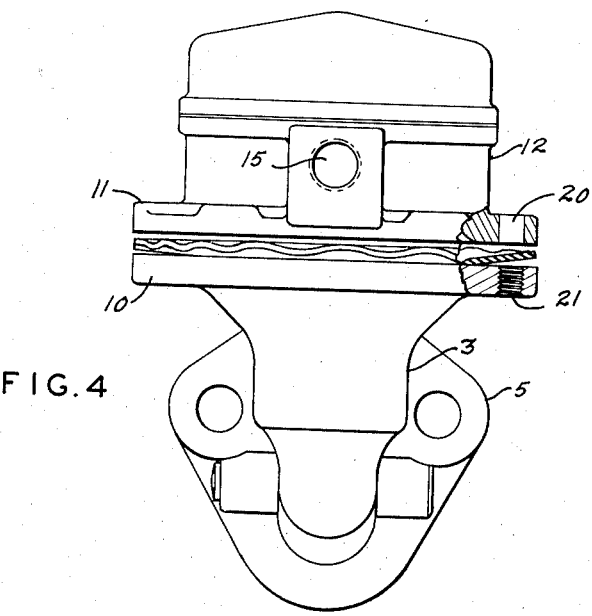
Fig. 4 is a front elevation of the position of the parts before the diaphragm is clamped during assembly.
Figures 5, 6:
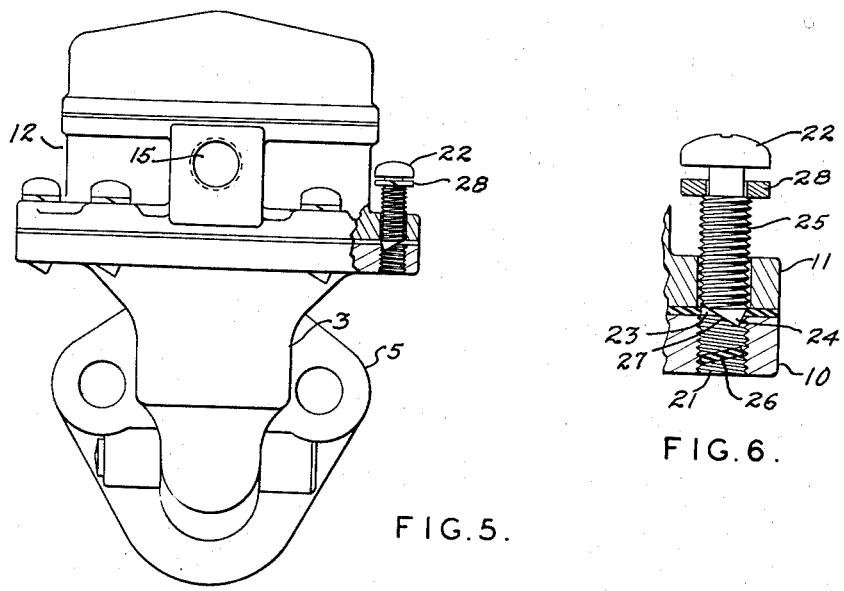
Fig. 5 is a front elevation similar to Fig. 4 showing the flanges of the pump clamped tightly on the diaphragm.
Fig. 6 is an enlarged fragmentary view of the clamping screw shown in Fig. 5.

As viewed in Fig. 3, the looping operation forms a series of wrinkles about the periphery of the diaphragm, as at 17, as the outer edge of the diaphragm is pulled into registry with the flange outer edge. In the next step, the valve casing 12 is placed in position with the screw holes 20, 21 in alignment, and subsequently clamped, as shown in Fig. 5, to flatten the wrinkles 17 in the diaphragm. Subsequent to this operation, the screws 22 are inserted, preferably simultaneously, by machine, and the pump secured in assembled condition.

During assembly, the screws 22, with washers 28 thereon, are rapidly rotated. This causes the cutting edge 24 to sever and pierce the diaphragm 6, forming, as it does so, a hole 23 in the diaphragm slightly less in diameter than the root diameter of the threads on the screw 22. This insures a tight engagement between the material of the diaphragm 6 and the screw threads 25. The blank 26, severed from the diaphragm, is forced from the holes 21 during the engagement of the screw.

Screw 22 is formed with the cutting edge 24 by cutting the end of the screw on the bias, as illustrated at 27.

Certain structures have been described herein which will fulfill all the objects of the present invention, but it is contemplated that other modifications will be obvious to those skilled in the art which come within the scope of the invention as defined by the appended claim.

We claim:

The method of clamping a pump diaphragm between two casings having opposing flanges formed with apertures to receive screws having cutting edges, which comprises the steps of pressing the central portion of the diaphragm into one casing below the plane of the flange thereof to bring a relatively larger circumference of the diaphragm into a registering position in overlying relation with the smaller circumference of the flange, thereby leaving a surplus of diaphragm material circumferentially of the flange, pressing said diaphragm flat between said flanges while in said position by clamping the casing flanges together against the diaphragm, and then threading said screws having said cutting edges through said apertures to cut holes in said diaphragm and to clamp the diaphragm between said flanges.

References Cited in the file of this patent

UNITED STATES PATENTS 2,104,446   Babitch _____ Jan. 4, 1938